(12) United States Patent
Hannila

(10) Patent No.: US 11,934,852 B1
(45) Date of Patent: Mar. 19, 2024

(54) PROVIDING HELP CONTENT PROACTIVELY

(71) Applicant: Trimble Solutions Corporation, Espoo (FI)

(72) Inventor: Jaana Hannila, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 0 days.

(21) Appl. No.: 18/071,854

(22) Filed: Nov. 30, 2022

(51) Int. Cl.
*G06F 9/451* (2018.01)

(52) U.S. Cl.
CPC ............................. *G06F 9/453* (2018.02)

(58) Field of Classification Search
CPC ........................................................ G06F 40/30
See application file for complete search history.

(56) References Cited

U.S. PATENT DOCUMENTS

| | | | |
|---|---|---|---|
| 5,251,294 A | 10/1993 | Abelow | |
| 5,805,171 A | 9/1998 | St. Clair et al. | |
| 8,203,502 B1 * | 6/2012 | Chi | G06F 3/03547 359/630 |
| 8,438,524 B1 | 5/2013 | Kohli et al. | |
| 10,013,510 B1 | 7/2018 | Kanthasamy et al. | |
| 10,817,140 B2 | 10/2020 | Pitkänen | |
| 10,825,236 B1 | 11/2020 | Vorobyov et al. | |
| 2002/0126118 A1 | 9/2002 | Shaikh | |
| 2007/0236507 A1 | 10/2007 | Tigges | |
| 2008/0098311 A1 | 4/2008 | Delarue et al. | |
| 2013/0325410 A1 | 12/2013 | Jung et al. | |
| 2014/0099622 A1 * | 4/2014 | Arnold | G09B 5/00 434/308 |
| 2014/0181651 A1 * | 6/2014 | Yamamoto | G06F 3/0481 715/705 |
| 2017/0084189 A1 * | 3/2017 | Rubalcaba | G09B 7/04 |
| 2017/0277778 A1 * | 9/2017 | Cherukuri | G06Q 30/0256 |
| 2017/0316596 A1 | 11/2017 | Pollock et al. | |
| 2017/0349300 A1 | 12/2017 | Senesac | |
| 2019/0096280 A1 * | 3/2019 | Saunders | G06F 11/3013 |
| 2019/0114041 A1 | 4/2019 | Pitkänen | |
| 2019/0213911 A1 * | 7/2019 | Lafreniere | G09B 19/0053 |
| 2019/0251747 A1 | 8/2019 | Yin et al. | |
| 2019/0347376 A1 | 11/2019 | Stoddart et al. | |
| 2020/0175076 A1 * | 6/2020 | Powers | G06Q 50/01 |

(Continued)

OTHER PUBLICATIONS

Extended European Search Report for Application No. 23151559.4-1224, dated Jun. 7, 2023, 16 pages.

(Continued)

*Primary Examiner* — Di Xiao

(74) *Attorney, Agent, or Firm* — Kilpatrick Townsend & Stockton LLP

(57) ABSTRACT

To facilitate use of a vast help content, while a modeling application is running, user interface actions to the modeling application are monitored, at least for an automatic help. When it is detected that consecutive user interface actions fulfill at least one of a plurality of predefined criteria for automatic help, help content is retrieved from online helping information. The online helping information comprises at least helping information of the modeling application and helping information created by a user community. In the retrieving of the help content at least a portion of the consecutive user interface actions are used.

16 Claims, 3 Drawing Sheets

(56) References Cited

U.S. PATENT DOCUMENTS

2021/0271783 A1\* 9/2021 Okada ................... G06F 30/10

OTHER PUBLICATIONS

Borrmann, A. et al., "Multi-Scale Geometric-Semantic Modeling of Shield Tunnels for GIS and BIM Applications," Computer-Aided Civil and Infrastructure Engineering, vol. 30, No. 4, Sep. 2, 2014, pp. 263-281.
Breunig, M. et al., "Collaborative Multi-Scale 3D City and Infrastructure Modeling and Simulation," The International Archives of the Photogrammetry, Remote Sensing and Spatial Information Sciences, vol. XLII-4/W4, Sep. 27, 2017, pp. 341-352.
Dario, P. et al., "A Novel Mechatronic Tool for Computer-Assisted Arthroscopy," IEEE Transaction on Information Technology in Biomedicine, vol. 4, No. 1, Mar. 2000, 15 pages.

\* cited by examiner

PROVIDING HELP CONTENT PROACTIVELY

FIELD

The present invention relates generally to modeling applications and, especially to providing help content for a user using a modeling application.

BACKGROUND ART

A modeling application is an application that contains a variety of tools and features enabling versatile alternatives for a user to use the application. Building Information Modeling (BIM) applications are examples of modeling applications. BIM is a process including the generation and the management of digital representations of physical and functional characteristics of physical spaces. BIM applications are modeling applications that allow a user to work according to his/her own vision, rules and preferences on how to use the tools and features. Modeling applications are provided with online help services, such as a user assistance service, where users can browse help content, use search words and retrieve help content, for example instructional and support content. There are also different discussion forums, for example, where users may seek answers to their problems from other users or from existing answers to similar problems. The amount of information is huge. Further, some pieces of the information are more suitable to less experienced users, some pieces to experienced users. Consequently, finding relevant information can be difficult for a user. Hence, more effective techniques to find relevant information are needed.

SUMMARY

According to an aspect there is provided a computer implemented method comprising: running, for at least a model of one or more physical structures, wherein a model object in the model represents at least a piece of a physical structure, a modeling application comprising a plurality of predefined criteria for automatic help; monitoring, at least for the automatic help, user interface actions to the modeling application; retrieving, in response to detecting that consecutive user interface actions fulfill at least one predefined criterion for the automatic help, using at least portion of the consecutive user interface actions, help content from online helping information comprising at least helping information of the modeling application and helping information created by user community of the modeling application; and outputting, by the computing device, the help content retrieved.

According to another aspect there is provided a non-transitory computer readable storage medium storing processor-executable instructions, that, when executed, cause one or more processors to: running, for at least a model of one or more physical structures, wherein a model object in the model represents at least a piece of a physical structure, a modeling application comprising a plurality of predefined criteria for automatic help; monitoring, at least for the automatic help, user interface actions to the modeling application; retrieving, in response to detecting that consecutive user interface actions fulfill at least one predefined criterion for the automatic help, using at least portion of the consecutive user interface actions, help content from online helping information comprising at least helping information of the modeling application and helping information created by user community of the modeling application; and outputting, by the computing device, the help content retrieved.

According to a further aspect there is provided an apparatus comprising at least one processor; and at least one memory including computer program code and operable connected to the at least one processor; the at least one memory and the computer program code being configured to, with the at least one processor, to cause the apparatus to perform at least following: running, for at least a model of one or more physical structures, wherein a model object in the model represents at least a piece of a physical structure, a modeling application comprising a plurality of predefined criteria for automatic help; monitoring, at least for the automatic help, user interface actions to the modeling application; retrieving, in response to detecting that consecutive user interface actions fulfill at least one predefined criterion for the automatic help, using at least portion of the consecutive user interface actions, help content from online helping information comprising at least helping information of the modeling application and helping information created by user community of the modeling application; and outputting, by the computing device, the help content retrieved.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

Figure 1:
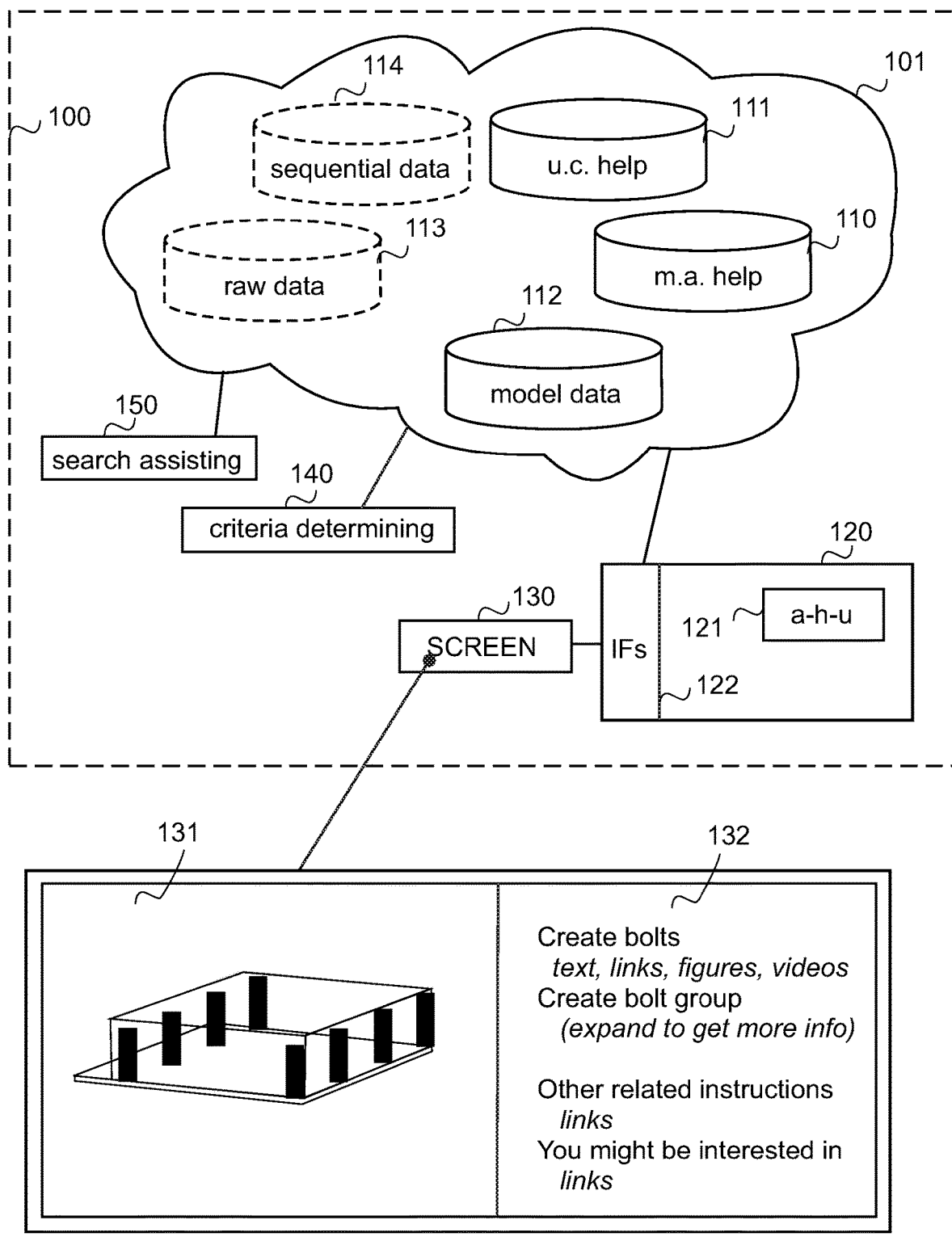
FIG. 1 shows a simplified architecture of an exemplary system and a schematic block diagrams of some apparatuses.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments/examples to consist of only those features that have been mentioned and such embodiments may also contain features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first predefined number could be termed a second predefined number, and similarly, a second predefined number could be also termed a first predefined number without departing from the scope of the present disclosure.

Different embodiments and examples are described below using single units, models, equipment, and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices, or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Correspondingly, Web 3.0, also known as the third-generation internet, implementing for example blockchain technology, may cause one or more of the functionalities described below to be distributed across a plurality of apparatuses or devices. Therefore, all words and expressions should be interpreted broadly, and they are intended to illustrate, not to restrict, the embodiment.

The solution of the present invention is applicable to be used by any apparatus, system or equipment that is configured or configurable to support computer-aided modeling, and corresponding modeling applications (i.e. modeling programs), that are configured or configurable to at least monitor user interface actions. Herein, a term "user interface action" includes any input of one of a plurality of different commands, actions and values to different attribute fields as well as use of user interface means, like a click of a mouse or pointer. Examples of such modeling applications include different BIM applications, and other expert system applications. Current BIM applications are used to plan, design, construct, operate and maintain diverse construction products (physical structures), such as different buildings, roads, bridges, ports, tunnels, etc.

FIG. 1 illustrates a simplified system describing only some logical units with their operative connections, the implementation of which may deviate from what is presented. It is obvious to a person skilled in the art that the system may also comprise other functions and structures that need not be described in greater detail here, or the system may comprise only some of the functions and structures described. The more detailed structure of the system is irrelevant to the actual invention.

The system 100 illustrated in FIG. 1 is a simplified computing environment that comprises a data storage 101 and one or more apparatuses connectable to the data storage 101.

The data storage 101 may be any kind of conventional or future data repository, including distributed, or centralized, or decentralized storing of data, managed by any suitable management system forming part of the computing environment. An example of distributed storing includes a cloud-based storage in a cloud environment (which may be a public cloud, a community cloud, a private cloud, or a hybrid cloud, for example). Cloud storage services may be accessed through a co-located cloud computer service, a web service application programming interface (API) or by applications that utilize API, such as cloud desktop storage, a cloud storage gateway or Web-based content management systems. However, the implementation of the data storage 101, the manner how data is stored, retrieved and updated, are irrelevant to the invention.

The data storage 101 comprises in the illustrated example one or more databases (one or more memory devices) 110 for helping information of the modeling application (m.a. help), one or more databases (one or more memory devices) 111 for helping information created by user community of the modeling application (u.c. help), one or more databases (one or more memory devices) 112 for model data, one or more databases (one or more memory devices) 113 for raw data, and one or more databases (one or more memory devices) 114 for sequential data. The user community may comprise one or more user communities, or sub-communities. The helping information is online helping information. In other words, it is helping information available over a data connection (communication connection) and, depending on its implementations and access rights, can be downloaded to an apparatus to be used when the apparatus is in an offline mode without the connection. Depending on an implementation, the data storage 101 may be a global data storage, a country-specific data storage, a company-specific data storage, or a department-specific data storage, for example. Further examples include that the data storage or the databases comprises different types of data, for example language-specific, company-specific, department-specific, or even user-specific data. In one scenario the database 110 for the helping information of the modeling application is a global database, whereas there are a plurality of databases 111 for the helping information created by user community of the modeling application, the plurality of the databases 111 comprising helping information for different regions/access levels and/or in different languages, such as for a region or country or continent, for a company, and for departments in the company, and the database 112 for the model data may be a company-specific database. The above are just mere non-limiting examples illustrating that any scenario is possible. Further, it should be appreciated that a database means herein a collection of data.

The helping information of the modeling application in the database 110 includes information in different online help services provided as part of the modeling application, such as an online user assistance service, for example a knowledge bank or a help system, and it may contain text, links, audio and/or video. The database 110 with its management system provides a platform or a service, where users can browse, use search words and retrieve help content, for example instructional and support content, created by a company providing the modeling application.

The helping information created by user community of the modeling application, depicted by one database 111 illustrating a plurality of databases, includes versatile information created by users of the modeling application to provide other users for tips, hint and help, for example in different discussion forums, where users may seek answers to their problems from other users or from existing answers to similar problems. Further non-limiting examples include different web-pages, articles and blogs published on the internet or on social media. The user community may combine aspects of tacit and explicit knowledge. Users understand other users, and hence the user community is good at creating and maintaining useful knowledge content. As said above, some of the helping information created by the user community, may be global, or country-specific, but some may be company-specific, or department-specific i.e. allowable to be seen (used) within a company or a department only. This allows a user community within a company or within a department to include their own knowledge to be included in automatic help content retrieval described herein while ensuring that said own knowledge remains within the company/department, and the best practices do not leak to competitors.

The model data 112, using a building information modeling application as a non-limiting example, may comprise information on different modeled physical structures and spaces, and one or more tools used. For example, a model may be a model of one or more physical structures, wherein a model object in the model represents at least a piece of a physical structure. A tool refers to a specific functionality of the modeling application. For example, a tool may be used for creating a group of model objects that are easy to model and modify as a single unit. A tool may contain a user interface via which values may be adjusted before the tool is executed. Further, environment information, like country, type information, like concrete or steel, may be stored to the model data as separate information. It should be appreciated that model data, or any data created by modeling application and comprising data representing what has been modeled/created, may comprise any other information, the previous examples are just to illustrate, not to limit, what the model data may comprise.

The databases 113, 114 for the raw data and for the sequential data are depicted with hashed lines since in some embodiments they or one of them are not used in real-time but may be used at different times for machine learning purposes only, for example in accordance with the teachings of U.S. Pub. No. 2019/0114041, entitled "Sequential data", published Apr. 18, 2019, issued as U.S. Pat. No. 10,817,140 on Oct. 27, 2020, the disclosure of which is incorporated by reference herein.

The raw data may comprise user interface actions collected as an automated background operation from apparatuses used by the users when a modeling application is running. The data collection may happen in real-time all the time the modeling application is running, or occasionally. The sequential data means data processed from the raw data, for example in accordance with the teachings of U.S. Pub. No. 2019/0114041, entitled "Sequential data", published Apr. 18, 2019, issued as U.S. Pat. No. 10,817,140 on Oct. 27, 2020, the disclosure of which is incorporated by reference herein.

The system 100 comprises apparatuses 120 (one illustrated in FIG. 1) for users to use the modeling application. A non-limiting list of examples of apparatuses 120 includes a user terminal or a workstation, such as a laptop, a smartphone, a personal computer, a tablet computer, a field device, a virtual reality device, augmented reality (AR) interface device, a web client, or a server, like a cloud server or a grid server. The apparatus 120 may be any computing device that can be configured to at least perform automatic help content retrieval, as will be described below. For that purpose, the apparatus 120 comprises a unit 121, or tool, called herein an automatic help unit (a-h-u) 121. The automatic help unit 121 may be part of a modeling application, or an add-in or a plug-in to the modeling application. The automatic help unit may comprise one or more sub-units. The sub-units may be artificial intelligence based trained models, for example a trained machine learning based search tool, and/or predefined criteria created by an artificial intelligence based tool or by other means. The apparatus 120 further comprises different interfaces (IFs) 122. One of the interfaces 122 may be an interface towards the data storage 101, to retrieve one or more models and/or to publish (store) one or more models to the model data, and to have access to the online helping information in the one or more databases 110, 111. One or more of the interfaces 122 may be a user interface, for example an interface for a keyboard, or an interface to a display screen 130. The user may, depending on modeling application in use, create a model, modify a model, study it, output (display, print) desired technical documents, such as the engineering drawings, and/or reports of the model, view the model, input information, including different selections, etc. by using the user interface(s) and interfaced devices.

In the illustrated example of FIG. 1, the automatic help unit has retrieved help content 132, displayed in the illustrated example with a model view 131. This allows the user to view the instruction and the model simultaneously. There are no limitations on how the help content is displayed and how much of the help content is displayed. For example, depending on an implementation, possibly also user settings, the displayed help content may comprise one or more pieces of information. In a non-limiting example, only the best match of the help content may be displayed, and with an input "show further results", further results will be displayed, possibly one by one. In another non-limiting example, illustrated in the model view 131, the best match, i.e. the most appropriate help content, depicted by "Create bolts", may be displayed with details, others directly related to the best match, depicted by "Create bolt group", as names and a possibility to expand the view to display details, and under title "Other related instructions", links to a predefined number of other instructions, or certain instructions, like "Shift the work plane", or "Bolt length calculation", or "Creating holes for bolts", may be displayed, and further tips for other features, like "Creating welds", "Check assembly", "Adjusting snap switches", may be displayed as links under title "You may be also interested in". The help content may be of any content type. Hence, it is possible to output a limited set of the online helping information. Further, the help content may be presented in a virtual 3D environment, which facilitates learning to use the modeling application, especially for novice users, and understanding of the help content, since the user does not have to shift between the help content and the modeling environment.

The system may also comprise one or more apparatuses 140, or criteria determining circuitries, connectable to the data storage 101, configured to create at least the predetermined criteria. By way of example only, a criteria determining circuitry 140 may be constructed and function in accordance with the teachings of U.S. Pub. No. 2019/0114041, entitled "Sequential data", published Apr. 18, 2019, issued as U.S. Pat. No. 10,817,140 on Oct. 27, 2020, the disclosure of which is incorporated by reference herein.

The system may also comprise one or more apparatuses 150, or search assisting circuitries, connectable to the data storage 101, configured to at least create information assisting in the search, for example to create a trained artificial intelligence based search tool to be included in the automatic help unit and/or classify the helping information in the databases 110, 111, based on target/evaluated experience level of the content, for example. Classification results may be stored, possibly updated at certain intervals, to metadata, or otherwise tagged/labeled, for example. By way of example only, the search assisting circuitry 150 may be based on Google® Programmable Search Engine, or Elasticsearch search engine, or Apache Solr™ open source enterprise platform, or a latent semantic analysis or on a modified latent semantic analysis to which the online helping information, or updates to the online helping information after the last training event, in the databases 110, 111 may be input and processed. In the latent semantic analysis, the processing includes pre-processing (cleaning documents), a core latent semantic analysis, generating a semantic vector space, and post processing. In the modified latent semantic analysis the core latent semantic analysis part is not included and the semantic vector space, i.e. the semantic vectors, is created via an advanced derivative/variation of the Term Frequency times Inverse Document Frequency, TF-iDF, function, and using in the post processing cosine similarity between semantic vectors to calculate similarity score. In some embodiments, the search assisting circuitry may be comprised in an apparatus configured to train and retrain an artificial intelligence based model that is trained to create a search query with search words, search the online helping information and sort the thus retrieved help content to a suitability order.

Figure 2:
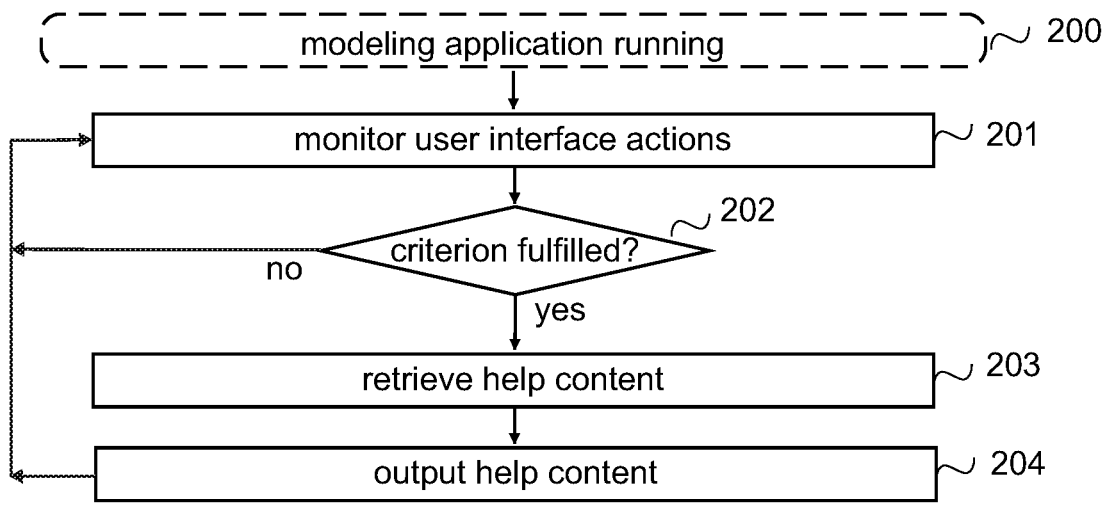
FIGS. 2 to 6 illustrate different exemplary functionalities.

FIG. 2 illustrates an example of a functionality of the computing device, or the automatic help unit in the computing device, when a user is processing a model of one or more physical structures. It should be appreciated that modeling functions, like displaying the model, storing the model, ending modeling, etc., are not described herein, for the sake of clarity of the description. In addition, for the sake of clarity of the description, steps relating to connection establishment(s) to data storages, and to access rights checking, if any performed, to retrieve or store data are not described herein.

Referring to FIG. 2, when a modeling application is running (step 200) in the computing device, user interface actions to the modeling application are monitored (step 201), at least for the automatic help. In other words, any input of one of a plurality of different commands, actions, including selections of tools, and values to different attribute fields, including undo actions, are monitored. The monitoring for the automatic help includes that consecutive user interface actions are compared to a plurality of predefined criteria for automatic help, to detect (step 202) whether the consecutive user interface actions fulfill at least one predefined criterion for the automatic help of the plurality of the predefined criteria for automatic help. Different examples of the predefined criteria are disclosed below with FIG. 5. In response to detecting that consecutive user interface actions fulfill (step 202: yes) at least one predefined criterion for the automatic help, help content is retrieved in step 203 from the online helping information comprising at least the helping information of the modeling application and the helping information created by the user community of the modeling application, accessible to the user. The help content is retrieved using at least a portion of the consecutive user interface actions. For example, to retrieve the help content, a search query may be automatically generated using a name of a command, or names of commands, and/or name(s) of dialog(s) and/or names of function(s) and or name(s) of tool(s) used before an undo command or before an error situation causing the at least one predefined criterion to be fulfilled. The help content retrieved is output in step 204 to the user, for example as illustrated in FIG. 1.

By detecting, based on monitored user interface actions, when the at least one predefined criterion is fulfilled, the help, and hence guidance, will be initiated and delivered to the user based on monitored user behavior, in a proactive manner, before a specific activity, like an input requesting help. Further, the help content is retrieved in real time, including that the search query will be generated and executed in real time, without any specific search related user input. In addition, since the help content is retrieved without search words inputted by a user, the search words are more likely to match to the words in the online helping information, resulting that the user does not have to repeat the search with other words and/or scroll around to find the right data. Further, compared to a help functionality provided by a modeling application in response to a user requesting help content, said help content is predetermined and fixed, whereas the help content provided is dynamic, based on the user's current situation and modeling context.

Figure 3:
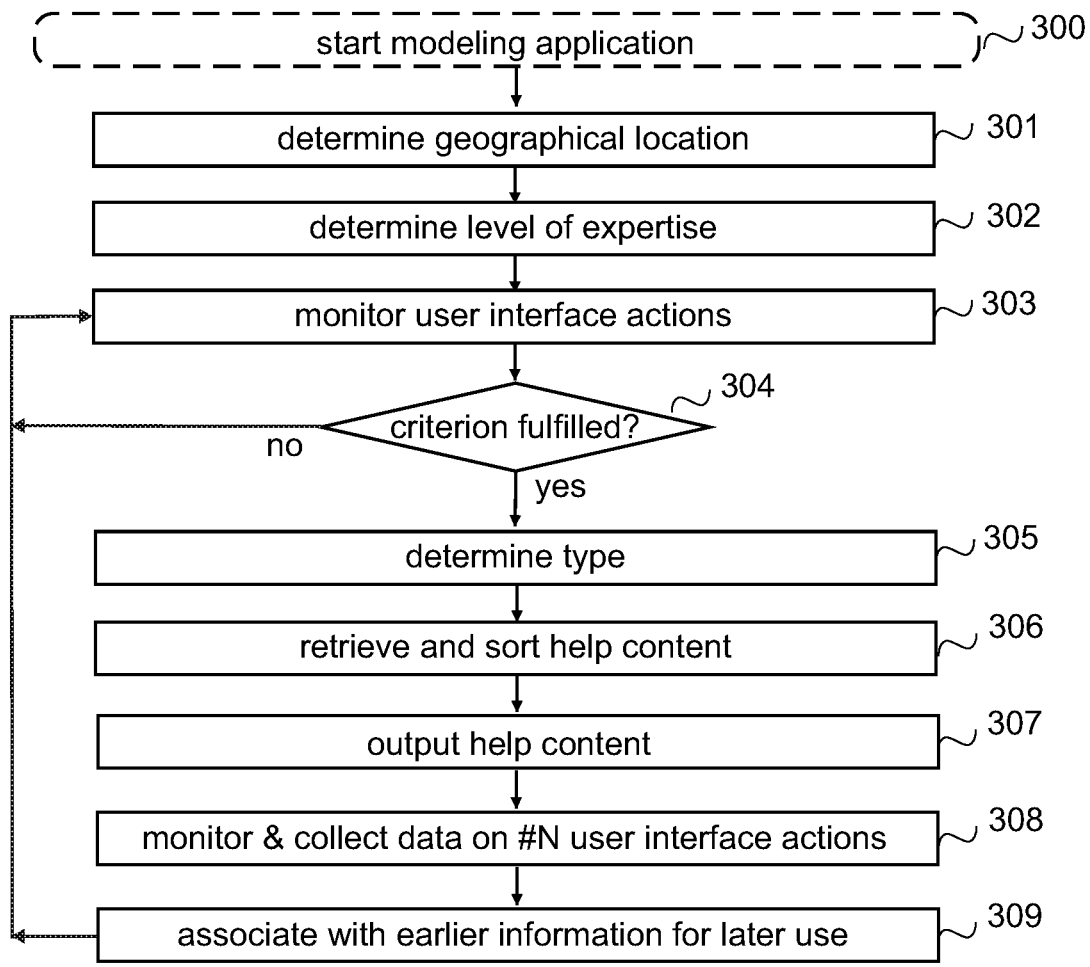

FIG. 3 illustrates another example of a functionality of the computing device, or the automatic help unit in the computing device, when a user is processing a model of one or more physical structures. It should be appreciated that modeling functions, like displaying the model, storing the model, ending modeling, etc., are not described herein, for the sake of clarity of the description. In addition, for the sake of clarity of the description, steps relating to connection establishment(s) to data storages, and to access rights checking, if any performed, to retrieve or store data are not described herein. In the example of FIG. 3, it is assumed that the modeling application is an application in which there are a plurality of ways to define model objects and which may require a license to run.

Referring to FIG. 3, when a modeling application is started (step 300), the user's geographical location is determined in step 301. By doing this, help content that is not relevant in the location of the user, for example, topics related to building products sold in Europe but not in North America, when the user is from the USA, can be filtered out, for example by using the location as part of a search query.

Further, in the illustrated example, the level of expertise of the user is determined in step 302. Depending on an implementation, the level of expertise may be determined by determining the type of the license, and/or the time the user has had the license, and/or the time the user has used the modeling application, and/or the way the model objects are defined, based on the user's user interface actions. It may be that there are different types of licenses, for example, a student license, a trial license, a professional user license, a main user license, etc., with which, or with some of which, an expertise level may be associated. The level of the expertise, determined based on the license, may depend on a time passed after the license has been bought or activated. In some implementations the user's user interface actions are used in determining or updating the level of expertise. That reflects how quickly a beginner user learns to use the modeling application. Further, it also takes into account that an experienced user may have a new license. For example, the user may have changed a company, and thereby her/his license may appear as a new license, indicating a novice user, or a beginner, even though the user is an experienced (knowledgeable) user. The user's user interface actions indicate the level of expertise, since a novice user repeats the same command sequence over and over again when an expert user performs the same task using a single or only few commands. When there is a separate help desk service available, for example a person or a bot responding to the user's question, the frequency the user contact the help desk and/or content of questions, may be used to determine the level of expertise, and the help desk may associate the level of expertise with the license information, for example. For example, a question "how to open a model" may indicate that the user is a novice. The help desk may naturally ask the user his/her level of expertise. Naturally, the system may have stored the user's level of expertise, determined during the previous time the user used the application. Still further examples include that the user may be allowed to input her/his level of expertise and/or change the level of expertise determined earlier, for example when the user feels that the proactive help (automatic help) outputs too difficult information or basic information not helping the user.

The user interface actions to the modeling application are monitored (step 303), at least for the automatic help, to detect (step 304) whether the consecutive user interface actions fulfill at least one predefined criterion for the automatic help of the plurality of the predefined criteria for automatic help, as described above with FIG. 2. In the illustrated example, the at least one predefined criterion for the automatic help may depend also on the level of expertise. The level of expertise may be updated during the monitoring. When the user interface actions are used, either alone, or with one or more of the other ways described to determine the level of expertise, the level of expertise may be determined or updated later, at any phase before the level of expertise is needed.

In response to detecting that consecutive user interface actions fulfill (step 304: yes) at least one predefined criterion for the automatic help for the level of expertise, in the illustrated example a type of one or more structures currently being modeled is determined. Depending on an implementation, the type determined may indicate the type of a material, or the type of a primary material, for example a wood, a steel, or concrete, including also reinforced concrete of the structure, and/or the type may indicate a structural type, for example a beam, a column, a slab, a joint, a bolt, a weld, etc.

In some implementations, the geographical location and/or the level of expertise may be determined, instead at the start, after it has been detected that the at least one predefined criterium for the automatic help has been fulfilled.

Then, to retrieve (step 306) and sort (step 306) the help content retrieved from the online helping information, accessible to the user, a search query may be automatically generated, for example as described above with FIG. 2, using at least portion of the consecutive user interface actions. Depending on an implementation, also the user's geographical location, and/or the type or types determined in step 305, and/or the user's level of expertise may be used in the automatically generated search query to retrieve the help content and/or used to sort the help content to a suitability order.

The help content retrieved and sorted is output in step 307 to the user, for example as illustrated in FIG. 1.

In the illustrated example, the process further comprises monitoring (step 308) and collecting (step 308) automatically, after outputting the help content, data on a predefined number (#N) of subsequent user interface actions. Typically the automatic data collection (automatic user feedback) is performed on the users' consent, and the users are aware, even though they do not notice, that the user interface action data is collected. For example, when a user first time starts to use the modeling application, a permission to collect user interface actions may be asked. However, the actual manner how the data on user interface actions is collected is irrelevant to the example, it suffices that collecting the data is possible. The monitoring and collecting in step 308 is performed to have information how the retrieved help content was used, for later use of said information. The collected information may be used, for example, to sort the online helping information to better match with said at least one predefined criterion for the automatic help. The collected information may indicate usefulness of the help content, and thereby indicate how good the automatic help unit functions. For example, if the user does not use the help content output, it may indicate that the search returned wrong helping information (wrong knowledge) for this user. The predefined number #N may be a fixed number, or an upper limit (collect until help content is closed or the upper limit exceeded), or a minimum number (collect until help content is closed but if closed without the minimum number being exceeded, collect user interface actions until the minimum number is exceeded).

The data collected in step 308 is associated in step 309 with earlier information. The earlier information may comprise, for example, the consecutive user interface actions that fulfilled in step 304 the at least one predefined criterion, that caused the help content to be retrieved and output. Naturally also preceding user interface actions may be included, and/or the earlier information may comprise the user's geographical location and/or the level of expertise, for example. The associating may include storing associations for later use. For example, the data obtained by said collecting and said associating with the earlier information may be used as training data when an artificial intelligence based search tool is being retrained.

In another implementation, instead of collecting the user interface actions, the user may be prompted, when the user is not going any more through online helping information retrieved automatically, for example when the user starts again modeling, to tick, for example, whether the help content provided was useful or not, how useful the help content was (e.g. very useful, useful), why it was not useful (e.g. too difficult, too basic, for other situation, wrong language), etc., and then use this information, possibly associated with the earlier information, for the above described purposes, and/or to update the user's level of expertise.

When the user starts modeling, the process continues (step 303) monitoring user interface actions.

The example illustrated in FIG. 3 takes into account a wide spectrum of different levels of experience of the users to provide them with appropriate help content. For example, a novice user is provided with basic help content without details of rarely used features targeted to experienced users, without the novice user getting lost in the details. Further, the basic help content is obtained using words used in the online helping information, which the novice user may not know, and hence a search using words input by the novice may not find appropriate content, or may find it after several attempts with different search words. On the other hand, a more experienced user does not need to scroll through basic details, and thanks to the automatically generated search query, the more experienced user does not need to recall infrequently used advanced options, for example. In other words, the novice users will be provided with information that assists them to create a basic understanding of the modeling application, whereas a more experienced user will be provided detailed information, which assumes a certain degree of understanding. This increases productivity and uses less computer resources, since time and resources are not used in going through helping information to find proper help content, or to use "guess and try" to find a way to model something.

Figure 4:
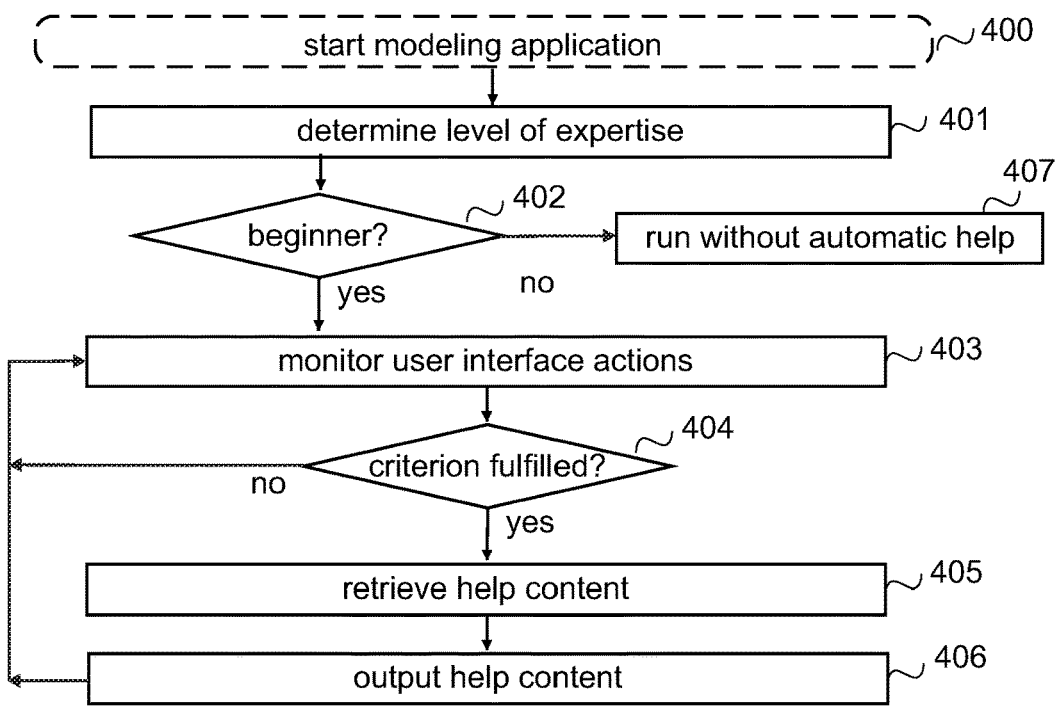

FIG. 4 illustrates a further example of a functionality of the computing device, or the automatic help unit in the computing device, when a user is processing a model of one or more physical structures. It should be appreciated that modeling functions, like displaying the model, storing the model, ending modeling, etc., are not described herein, for the sake of clarity of the description. In addition, for the sake of clarity of the description, steps relating to connection establishment(s) to data storages, and to access rights checking, if any performed, to retrieve or store data are not described herein. In the example of FIG. 3, it is assumed that the modeling application is an application in which there are a plurality of ways to define model objects and which may require a license to run. In the illustrated example of FIG. 4, the monitoring for the automatic help and the proactive retrieval of the help content is performed for novice users, i.e. for users whose level of expertise is a beginner. Thus, as described above, the novice users will more quickly learn how to use the modeling application, and need less time to find appropriate information. This increases productivity and uses less computer capacity.

Referring to FIG. 4, when a modeling application is started (step 400), a level of expertise of the user is determined in step 401, for example as described above with FIG. 3, and then it is checked in step 402, whether the user's level of experience is a beginner.

If the user's level of experience is a beginner (step 402: yes), user interface actions to the modeling application are monitored (step 403), at least for the automatic help, to detect (step 404) whether the consecutive user interface actions fulfill at least one predefined criterion for the automatic help of the plurality of the predefined criteria for automatic help, as described above with FIG. 2. In response to detecting that consecutive user interface actions fulfill (step 404: yes) at least one predefined criterion for the automatic help, help content is retrieved in step 405 from the online helping information, accessible to the user. The help content is retrieved using at least a portion of the consecutive user interface actions. For example, to retrieve the help content, a search query may be automatically generated using a name of a command, or names of commands, and/or name(s) of dialog(s) and/or names of function(s) and or name(s) of tool(s) used before an undo command or before an error situation causing the at least one predefined criterion to be fulfilled, using the words in the modeling application. The help content retrieved is output in step 406 to the user, for example as illustrated in FIG. 1.

If the user's level of experience is not a beginner (step 402: no), in the illustrated example the modeling application is run without the automatic help. For example, the automatic help unit may not be started.

Figure 5:
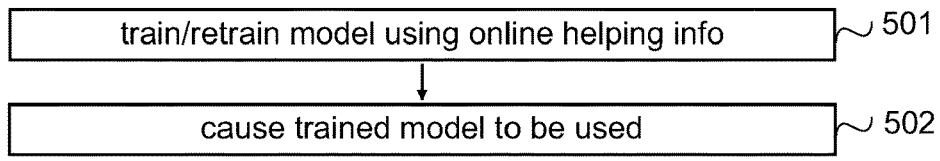

FIG. 5 illustrates an example functionality of the apparatus comprising the searching assistance circuitry for embodiments in which the automatic help unit comprises a trained artificial intelligence based search tool as a sub-unit. Different examples of artificial intelligence models that may be trained are discussed above with apparatus 150 in FIG. 1.

Referring to FIG. 5, the artificial intelligence based model, for example latent semantic analysis based model, described above with FIG. 1, is trained or retrained in step 501 to create search queries with search words, search the online helping information and sort the thus retrieved help content to a suitability order. The model may be trained by using at least online helping information. The training may include dividing the different pieces of information into sub-documents, one piece to a title and an actual content, for example for determining target level of the expertise. For example, a generic title or generic actual content are widely spread indicating a lower level of expertise, whereas a topic occurring many times within one piece but only in a few pieces, may indicate that the content is more suitable for a higher level of expertise. With an unsupervised training, one may use feedback from experts to validate, or calibrate the artificial intelligence based model. Further, it is possible, based on a distribution of a topic, for example, to take into account what content is not matching with the topic, and use that in the sorting phase to reduce the suitability. Further, information collected for example as described above with FIG. 3 on the use of help content output, may be used when the model is retrained. Then the apparatus causes in step 502 the trained model, or the retrained model to be used as part of the modeling application, for example by updating the modeling application, or the automatic help unit, so that the trained/retrained artificial intelligence based model will be used in the detecting and retrieving the help content automatically.

Figure 6:
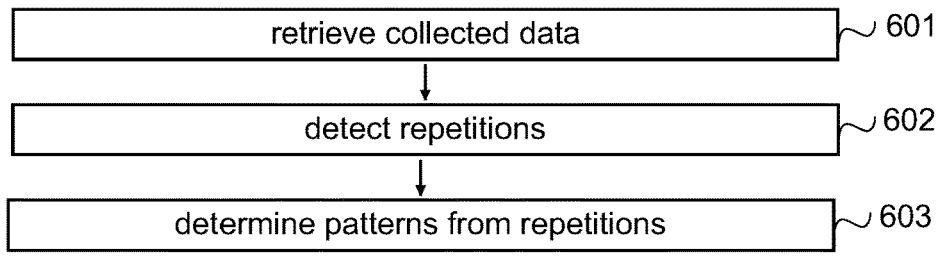

FIG. 6 illustrates an example functionality of the criteria determining circuitry, or one or more devices, which may comprise, per a device, one or more circuitries configured to implement at least part of the functionality. By way of example only, the process details may be in accordance with the teachings of U.S. Pub. No. 2019/0114041, entitled "Sequential data", published Apr. 18, 2019, issued as U.S. Pat. No. 10,817,140 on Oct. 27, 2020, the disclosure of which is incorporated by reference herein. Hence, there is no need to describe them in more detail herein.

Referring to FIG. 6, data collected on user interface actions, i.e. raw data and/or sequence data obtained from the raw data, is retrieved in step 601. The data collected on user interface actions may comprise data collected from a plurality of user apparatuses on a plurality of times when the modeling application has been run. Repetitions are detected in step 602 in the data retrieved, or in sequences obtained from the raw data. For example, data mining may be applied to the data to detect repetitions in step 602.

A non-limiting list of examples of repetitions that may be detected in step 602 comprises following repetitions. It should be appreciated that the different predetermined numbers may have the same value or different value, and a predetermined number may be a fixed number, or depend on the content of the repetition:

- A first predetermined number of user interface actions requesting help within a second predetermined number of consecutive user interface actions. For example, the first predetermined number may be one, whereas the second predetermined number may be repetition-specific. An example of a user interface action using help is a use of a function key, for example F1, dedicated to help functionality and outputting helping information of the modeling application to all users in a similar way, not taking into account the context.
- A third predetermined number of user interface actions in a search field of the modeling application within a fourth predetermined number of consecutive user interface actions. For example, the third predetermined number may be one for user interface action triggering a search.
- A fifth predetermined number of user interface actions selecting a sixth predetermined number of user interface commands within a seventh predetermined number of user interface actions.
- Within eight predetermined number of user interface actions, a ninth predetermined number of user interface actions to undo at least one preceding user interface action immediately after receiving a user interface command. In one embodiment, the repetition excludes a delete command, i.e. the repetition may be
- within eight predetermined number of user interface actions, a ninth predetermined number of user interface actions to undo at least one preceding user interface action immediately after receiving a user interface command, which is not a delete command. By excluding the delete command, a frequent use of the delete command by deleting an object to view what is behind the object, for example, is taken into account, and does not in vain trigger the automatic search when it is not needed.
- A tenth predetermined number of sequences of successive user interface actions, a sequence comprising an eleventh predetermined number of successive two or more different commands in the same order and ending with a new command.

A twelfth predetermined number of successive user interface actions to modify a first model object.

A thirteenth predetermined number of user interface actions requesting exit within a fourteenth predetermined number of consecutive user interface actions.

A fifteenth predetermined number of consecutive user interface actions resulting in an error situation in the modeling application.

Using a BIM application as an example of a modeling application, following repetition types (sequence type) may be found:

Repetitive search of a design tool
Repetitive tasks inside a design tool
Repetitive modify
Unexpected exit
Unexpected exit and search for similar design tool
Repetitive exit and return to design tool
Deleting created component created by design tool
Exploding created component created by design tool
Transaction delay between user interface actions compared to other user data
Error: caused by design tool settings
Error: caused by incorrect pick position in 3D-view
Error: caused by incorrect object pick in 3D-view It should be appreciated that the above is a non-limiting list comprising only a few examples, and further repetitions are possible.

Returning to FIG. 6, patterns are then determined in step 603 from the repetitions detected. The patterns are determined, per a repetition, by filtering from the consecutive user interface actions in the detected repetition at least any user interface action requesting help, any user interface action relating to use of the search field and any user interface action requesting exit. The thus determined patterns then form the predefined criteria for the automatic help, which will be triggered proactively, for example.

Using the patterns as the trigger of automatic retrieval of help content from the online helping information enables proactive automatic detection of the situations when a user may need help and will benefit from the proactive help, for example help will be provided before the user inputs an user interface action for help, or starts using search functionality. For example, a novice user may input "delete drawing object", "delete drawing object" and then "create horizontal dimension", which triggers the automatic search, to which the novice user is provided with help content on "how to create horizontal dimensions", since the automatic help unit predicted that the next user interface action would be use of the function key, for example F1, dedicated to help functionality. If the novice user did not need the help, he/she may ignore it. In some embodiments, a user interface action in the modeling view may end outputting the help content.

As is evident from the above, the different examples, implementations and embodiments bring together all relevant knowledge sources and provide users mechanisms to integrate their own knowledge into the service, even department-specifically, and extend ways to transfer silent information.

The steps, and related functions described above using FIGS. 1 to 6 are in no absolute chronological order, and some of the steps/functions and information sharing may be performed simultaneously or in an order differing from the given one. Other functions can also be executed between the steps or within the steps and/or other information may be shared. For example, step 301 (determining geographical location) and/or step 302 (determining the level of experience) may be performed simultaneously with step 305 (determining type of the structure) or after that. Some of the steps or part of the steps can also be left out or replaced by a corresponding step or part of the step. For example, step 301 and/or step 305 and/or steps 308 and 309 relating to information on how the help content was used may be left out.

The techniques and methods described herein may be implemented by various means so that an apparatus/equipment/a device configured to provide the automatic retrieval of help content according to at least partly on what is disclosed above with any of FIGS. 1 to 6, including implementing one or more functions/operations described above with an embodiment/example, for example by means of any of FIGS. 1 to 6. Apparatuses (devices, equipments) may generally include one or more processors, controllers, control units, micro-controllers, or the like connected to one or more memories and to various interfaces of the apparatus, configured to implement the automatic help unit, and/or to train or otherwise generate one or more of sub-units for the automatic help unit. For example, any functionality described above may be implemented in hardware (one or more devices), firmware (one or more devices), software (one or more modules), or combinations thereof.

Figure 7:
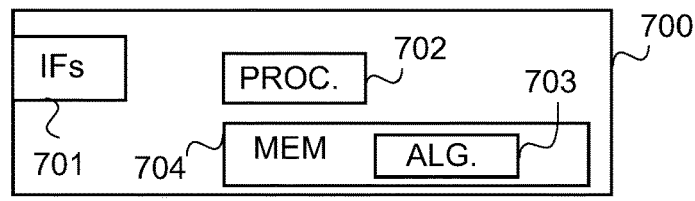
FIG. 7 is a schematic block diagram of an exemplary apparatus.

FIG. 7 is a simplified block diagram illustrating some units for an apparatus 700 configured to provide at least part of the functionality described above with FIGS. 1 to 6, comprising at least the automatic help unit or being configured to provide one or both of the sub-units, for example by (re)training corresponding artificial intelligence based models.

Referring to FIG. 7, the apparatus 700 comprises one or more interfaces (IFs) 701, for example, for retrieving (obtaining) online helping information, and/or information on collected user interface actions, such as the raw data and/or sequential data and/or for monitoring and/or for collecting user interface actions. The one or more interfaces may comprise one or more user interfaces for user interface actions. The apparatus 700 further comprises one or more processors 702 configured to implement at least part of the functionality described above with FIGS. 1 to 6, with corresponding algorithms 703, and one or more memories 704 usable for storing a computer program code required for the functionality of the apparatus. The computer program code may include the one or more automatic help units, or trainable models for sub-units, i.e. the algorithms for implementing the functionality of a corresponding entity. The memory 704 is also usable for storing other information, such as access rights related information.

Generally a processor 702 is a central processing unit, but the processor may be an additional operation processor. The algorithms described herein for sharing information may be configured as a computer or a processor, or a multi-core processor or a microprocessor, such as a single-chip computer element, or as a chipset, including at least a memory for providing storage area used for arithmetic operation and an operation processor for executing the arithmetic operation. The one or more processors may comprise one or more computer processors, application-specific integrated circuits (ASIC), digital signal processors (DSP), programmable logic devices (PLD), field-programmable gate arrays (FPGA), graphics processing units (GPUs), logic gates and/or other hardware components that have been programmed and/or will be programmed by downloading computer program code (one or more algorithms) in such a way to carry out one or more functions described above. An embodiment provides a computer program embodied on any client-readable distribution/data storage medium or memory unit(s) or article(s) of manufacture, comprising program instructions executable by one or more processors/computers, which instructions, when loaded into an apparatus/device, constitute the automatic help unit or a training unit for training a sub-unit, or a plugin, for example, to an existing corresponding unit or tool. Programs, also called program products, including software routines, program snippets constituting "program libraries", applets and macros, can be stored in any non-transitory medium and may be downloaded into an apparatus. In other words, each or some or one of the functionalities and/or the algorithms described above may be an element that comprises one or more arithmetic logic units, a number of special registers and control circuits.

The memory 704 may generally include volatile and/or non-volatile memory, for example flash memory, EEPROM, ROM, PROM, RAM, DRAM, SRAM, SGRAM, double floating-gate field effect transistor, firmware, programmable logic, read-mostly memory, write-only memory, etc. and typically store content, data, or the like. In other words, the one or more memories 704 may be of any type (different from each other), have any possible storage structure and, if required, being managed by any database management system. It is to be noted that the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud. The memory may also store computer program code such as software applications (for example, for one or more of the functionalities) or operating systems, information, data, content, or the like for the processor to perform steps associated with operation of the apparatus in accordance with examples/embodiments.

It will be obvious to a person skilled in the art that, as the technology advances, the inventive concept can be implemented in various ways. The invention and its embodiments are not limited to the examples described above but may vary within the scope of the claims.

What is claimed is:

1. A computer implemented method comprising:
    running, for at least a model of one or more physical structures, wherein a model object in the model represents at least a piece of a physical structure, a modeling application comprising a plurality of predefined criteria for automatic help;
    monitoring, at least for the automatic help, user interface actions to the modeling application;
    determining level of expertise of a user;
    retrieving, in response to detecting that consecutive user interface actions fulfill at least one predefined criterion for the automatic help, using at least portion of the consecutive user interface actions and the level of expertise of the user, help content from online helping information comprising at least helping information of the modeling application and helping information created by user community of the modeling application, wherein the at least one predefined criterion for the automatic help depends on the level of expertise of the user; and
    outputting, by a computing device, the help content retrieved, wherein the modeling application is associated with a license and is an application in which there are a plurality of ways to define model objects, and determining the level of expertise of the user comprises at least one of:
    determining a type of the license;
    determining a time the user has had the license;
    determining a time the user has used the modeling application; or
    determining, based on the user interface actions, the way the model objects are defined.

2. The computer implemented method of claim 1, wherein the plurality of predefined criteria comprises a plurality of patterns, wherein a pattern indicates a need for help and is a specific user interface action or a specific combination of user interface actions, the patterns being predetermined based on detected repetitions in data collected from a plurality of user apparatuses during a plurality of times when the modeling application has been run, the detected repetitions comprising at least one of:
    a first predetermined number of user interface actions requesting help within a second predetermined number of consecutive user interface actions,
    a third predetermined number of user interface actions in a search field of the modeling application within a fourth predetermined number of consecutive user interface actions,
    a fifth predetermined number of user interface actions selecting a sixth predetermined number of user interface commands within a seventh predetermined number of user interface actions,
    within eight predetermined number of user interface actions, a ninth predetermined number of user interface actions to undo at least one preceding user interface action immediately after receiving a user interface command,
    a tenth predetermined number of sequences of successive user interface actions, a sequence comprising an eleventh predetermined number of successive two or more different commands in a same order and ending with a new command,
    a twelfth predetermined number of successive user interface actions to modify a first model object,
    a thirteenth predetermined number of user interface actions requesting exit within a fourteenth predetermined number of consecutive user interface actions, or
    a fifteenth predetermined number of consecutive user interface actions resulting in an error situation in the modeling application.

3. The computer implemented method of claim 2, further comprising:
    retrieving the data;
    applying data mining to the data to detect repetitions; and
    determining, per a detected repetition, a pattern by filtering from the consecutive user interface actions in the detected repetition at least any user interface action requesting help, any user interface action relating to use of the search field and any user interface action requesting exit.

4. The computer implemented method of claim 1, further comprising:
    collecting, after outputting the help content, data on a predefined number of subsequent user interface actions;
    associating the level of expertise of the user, the data and the consecutive user interface actions fulfilling at least one predefined criterion for the automatic help causing the help content to be outputted; and using the information obtained by said collecting and said associating to sort the online helping information to better match with said at least one predefined criterion for the automatic help.

5. The computer implemented method of claim 1, further comprising:
in response to the level of expertise being a beginner, performing the monitoring, retrieving and outputting.

6. The computer implemented method of claim 1, further comprising:
collecting, after outputting the help content, data on subsequent user interface actions;
associating the data and the consecutive user interface actions fulfilling at least one predefined criterion for the automatic help causing the help content to be outputted; and
using the information obtained by said collecting and said associating to sort the online helping information to better match with said at least one predefined criterion for the automatic help.

7. The computer implemented method of claim 1, further comprising:
determining geographical location of the user; and
when retrieving the help content, using the geographical location.

8. The computer implemented method of claim 1, further comprising
determining a type of one or more structures currently being modeled; and
when retrieving the help content, using the type.

9. The computer implemented method of claim 1, further comprising
determining a type of a material of one or more structures currently being modeled; and
when retrieving the help content, using the type.

10. The computer implemented method of claim 1, further comprising:
using a trained artificial intelligence based model in the detecting and retrieving, the trained artificial intelligence model being trained to create a search query with search words, search the online helping information and sort the retrieved help content to a suitability order.

11. A non-transitory computer readable storage medium storing processor-executable instructions, that, when executed, cause one or more processors to perform steps comprising:
running, for at least a model of one or more physical structures, wherein a model object in the model represents at least a piece of a physical structure, a modeling application comprising a plurality of predefined criteria for automatic help;
monitoring, at least for the automatic help, user interface actions to the modeling application;
retrieving, in response to detecting that consecutive user interface actions fulfill at least one predefined criterion for the automatic help, using at least portion of the consecutive user interface actions, help content from online helping information comprising at least helping information of the modeling application and helping information created by user community of the modeling application;
outputting, by a computing device, the help content retrieved;
collecting, after outputting the help content, data on subsequent user interface actions;
associating the data and the consecutive user interface actions fulfilling at least one predefined criterion for the automatic help causing the help content to be outputted; and
using the information obtained by said collecting and said associating to sort the online helping information to better match with said at least one predefined criterion for the automatic help.

12. The non-transitory computer readable storage medium of claim 11, further comprising:
determining level of expertise of a user; and
retrieving the help content using also the level of expertise,
wherein the at least one predefined criterion for the automatic help depends on the level of expertise.

13. The non-transitory computer readable storage medium of claim 12, wherein the modeling application is associated with a license and is an application in which there are a plurality of ways to define model objects, and the determining the level of expertise of the user comprises at least one of:
determining a type of the license;
determining a time the user has had the license;
determining a time the user has used the modeling application; or
determining, based on the user interface actions, the way the model objects are defined.

14. The non-transitory computer readable storage medium of claim 11, further comprising:
determining level of expertise of a user; and
in response to the level of expertise being a beginner, performing the monitoring, retrieving and outputting.

15. An apparatus comprising:
at least one processor; and
at least one memory including computer program code and operable connected to the at least one processor;
the at least one memory and the computer program code being configured to, with the at least one processor, to cause the apparatus to perform at least the following:
running, for at least a model of one or more physical structures, wherein a model object in the model represents at least a piece of a physical structure, a modeling application comprising a plurality of predefined criteria for automatic help; monitoring, at least for the automatic help, user interface actions to the modeling application;
determining level of expertise of a user;
retrieving, in response to detecting that consecutive user interface actions fulfill at least one predefined criterion for the automatic help, using at least portion of the consecutive user interface actions and the level of expertise of the user, help content from online helping information comprising at least helping information of the modeling application and helping information created by user community of the modeling application, wherein the at least one predefined criterion for the automatic help depends on the level of expertise of the user;
outputting, by a computing device, the help content retrieved;
collecting, after outputting the help content, data on a predefined number of subsequent user interface actions;
associating the level of expertise of the user, the data and the consecutive user interface actions fulfilling at least one predefined criterion for the automatic help causing the help content to be outputted; and using the information obtained by said collecting and said associating to sort the online helping information to better match with said at least one predefined criterion for the automatic help.

16. The apparatus of claim 15, wherein the at least one memory and the computer program code are configured to, with the at least one processor, to cause the apparatus to further perform at least following:

determining level of expertise of a user; and retrieving the help content using also the level of expertise, wherein the at least one predefined criterion for the automatic help depends on the level of expertise.

* * * * *